United States Patent [19]

Rucki et al.

[11] Patent Number: 5,056,034

[45] Date of Patent: Oct. 8, 1991

[54] METHOD AND APPARATUS FOR CONTROLLING THE GAS CONTENT OF FOAM MATERIALS

[75] Inventors: William M. Rucki, Aurora; Jeanne M. Leidy, Rocky River, both of Ohio

[73] Assignee: Nordson Corporation, Westlake, Ohio

[21] Appl. No.: 439,251

[22] Filed: Nov. 20, 1989

[51] Int. Cl.$^5$ .............................................. G01N 9/02
[52] U.S. Cl. .................................... 364/510; 364/500; 73/434
[58] Field of Search .................. 364/500, 510; 73/196, 73/19.01, 433, 434; 222/251; 585/701

[56] References Cited

U.S. PATENT DOCUMENTS

| | | | |
|---|---|---|---|
| 4,120,032 | 10/1978 | Mirdadian | 364/510 |
| 4,195,527 | 4/1980 | Ebeling et al. | 73/434 |
| 4,288,230 | 9/1981 | Ebeling et al. | 364/500 |
| 4,779,762 | 10/1988 | Klein et al. | 73/19.01 |
| 4,924,695 | 5/1990 | Kolpak | 73/19.01 |

Primary Examiner—Parshotam S. Lall
Assistant Examiner—Ellis B. Ramirez
Attorney, Agent, or Firm—Wood, Herron & Evans

[57] ABSTRACT

A foam material dispensing system is provided with a control which measures the amount of high viscosity liquid material delivered to a mixer, determines the amount of pressurized gas required to be injected into the mixer in order to produce a foamable material with a desired gas concentration, measures the amount of gas actually delivered to the mixer, and generates a cumulative error signal representing the difference between the required amount of gas and the gas actually delivered. A control signal is generated to regulate the flow of gas to the mixer in relation to the magnitude of the error signal. A digital flow meter generates a pulse for each incremental amount of liquid material delivered to the mixer during an interval of time. During each successive interval, the pulses are counted and the count is multiplied by a preset gas-to-material ratio, from which the measured gas flow is subtracted and the difference added to the cumulative error term. The error term is combined with a term proportional to the amount of liquid material delivered over a predetermined number of successive time intervals to produce the control signal.

19 Claims, 3 Drawing Sheets

METHOD AND APPARATUS FOR CONTROLLING THE GAS CONTENT OF FOAM MATERIALS

The present invention relates to foam material dispensing systems and, more particularly, to systems for mixing gas and high viscosity liquid materials under pressure and dispensing the mixed material to form a foam, and to methods and apparatus for controlling the gas-to-material ratio of the dispensed foam.

Background of the Invention

Foam materials are used in a variety of applications where their bonding strength, resiliency, property retention and other characteristics are desired. A number of liquid materials such as liquid adhesives, sealants, and other such high viscosity materials attain enhanced properties when employed in the form of a foam. Foam adhesives, for example, have extensive use in the packaging fields and for the assembly of certain products. They are particularly suitable for use on packaging or production lines. Foam adhesive systems and devices for such systems are shown in detail in U.S. Pat. No. 4,059,466 to Scholl et al., U.S. Pat. No. 4,059,714 to Scholl et al., and U.S. Pat. No. 4,200,207 to Akers et al., commonly assigned to the assignee of the present application, and the disclosures are hereby expressly incorporated herein by reference.

Foam sealants or caulks may, for example, be provided by injecting air, or preferably an oxygen-free gas such as nitrogen, into the material prior to delivery to the dispensing device. The materials used for foam sealants or caulks are typically substances having medium to high viscosity, often formed from bulk material which is supplied to the material dispensing device. In such a system, the material is sometimes moderately heated to enhance its flow and setting properties, and is sometimes heated to higher temperatures to produce a hot-melt flowable material from a solid thermoplastic material supplied in bulk to the system.

The foam material is formulated in a foam material dispensing system by mixing the liquid material with compressed gas before it is dispensed in foamable form, as, for example, before dispensing an adhesive onto a part. In the foam dispensing system, the gas and the material are maintained under pressure so that the gas, which may be approximately 1/10th of one percent by weight of the adhesive mixture, is dissolved or otherwise contained in the mixture such that there is no more than a negligible change in volume from that of the material alone. When dispensed at atmospheric pressure, however, the gas in the mixture expands producing a foamed material of a density which has been reduced by the increased volume of the added expanded gas. The process of foaming the material and the apparatus for doing so are described in the commonly assigned U.S. Pat. No. 4,778,631 to Cobbs, et al., expressly incorporated herein by reference.

The foaming of the material such that it will have a desired density when expanded at standard temperature and pressure requires a precise concentration of foaming agent in the mix. Typically, as in a foam sealant dispensing system, for example, a gas-to-sealant ratio is desired which will produce a volume of gas which is approximately of the same order of magnitude as the volume of sealant in the foam sealant mix. As such, the mass ratio of the gas to the sealant would be of the order of one thousand to one. Accordingly, monitoring and controlling the amount of gas in the mixed material is difficult in that very small deviations in the mass of the solution can produce large errors in the desired density of the material when it foams at atmospheric pressure.

The gas-to-material ratio of such foamed materials may be attained by adding the density reducing gas at a controlled mass flow rate into a mixer in which there is injected a measured volume flow of the material. With many of the applications of the prior art, the dispensing of the foam as well as the flow of the liquid material into the mixer is fairly steady. Thus, there is adequate time for gas and liquid material to achieve a desired uniform ratio in the mix.

In hot-melt adhesive systems, ratios have been maintained by controls which measure parameters of the mixed foam adhesive to generate a feedback signal with which to vary the settings of flow control devices to adjust the relative amounts of gas and hot-melt fed to the mixer, as for example, are shown in the commonly assigned U.S. Pat. No. 4,779,762 to Klein et al., hereby expressly incorporated herein by reference. Because the mixed adhesive in hot-melt systems is usually of only moderate viscosity, recirculation of a major portion of the mixed adhesive from a discharge gun back to the mixer enhances the ability of a hot-melt system to maintain the gas concentration of the mix uniform where the corrective gas flow may not immediately follow that of the sealant into the mixer.

With the increased use of programmed dispensing devices such as robot controlled guns, as, for example, those for dispensing adhesives, the on and off switching of the dispensing guns and the varying of the discharge rates occurs more and more rapidly. Such automated guns move across workpieces at high and widely varying speeds, make sudden changes in direction and switch on and off frequently. Under such circumstances, the rapidly changing dispensing rate of the foamed material calls for a rapidly varying flow into the mixer of make-up liquid material and a correspondingly varying flow of injected gas. As a consequence, standard control mechanisms for controlling gas flow fail to respond to these changes so as to accurately maintain the gas concentration, or density reduction, of the mix. As a result, the gas-to-material ratio, or density reduction, of the mix, and thus the properties which the foamed material such as an adhesive will have when deposited on the parts, are not uniform where rapidly changing flow of liquid and foamed material is required.

The production of uniform gas-to-material ratio, or gas concentration, of the dispensed foam requires accurate metering of both the liquid material to be foamed and the gas, or blowing-agent, injected into the mixer. Currently, the more suitable flow meters for measuring the flow of liquid in foam dispensing systems are gear type devices which respond to the flow of material through them to produce digital square wave or pulse stream signals in which each pulse represents the flow of a fixed volume of liquid material through the meter.

The flow of the blowing-agent or gas in such systems is, on the other hand, more suitably achieved by a mass flow meter which, since the gas is highly compressible, produces a more accurate means of determining the volume at standard temperature and pressure than do devices which measure gas volume directly. These mass flow meters typically generate analog signals representing mass flow of the gas through the meter per unit time. Integration of such an analog signal over time provides a measurement of the total mass of injected gas. This mass measurement is convertible to a volume equivalent at a given temperature and pressure by simple computation.

Since one transducer generates a digital signal representing an amount measured in discrete quanta and the other generates an analog signal proportional to a flow of gas per unit time, a direct comparison is not possible. Traditionally this problem has been solved by converting the square wave signal to an analog signal with the use of a tachometer or frequency-to-voltage converter. The resulting analog signal then represents a liquid material flow per unit time which can be directly compared with the analog signal from the gas flow meter to determine the ratio at which the liquid material and the gas ar being injected to the mixer to produce the ratio that is desired.

Conversion of the digital signal by using a tachometer type device may be acceptable in some cases where the process is continuous, or, where the material flow on-time is large compared with the dwell time or off-time of the liquid material flow meter. With such a method, errors will, however, develop at the times immediately following flow startups, flow stops, or rapid flow rate changes. Such errors are a result of time constants necessary to convert a digital signal to an analog signal and other time delays inherent in the components of the system. The time constants are necessary to convert a pulse rate signal to an analog signal which is suitable for use in controlling the flow of the injected gas in stable manner. Such time constants or damping factors are necessary to minimize output ripple during normal operation. Reducing such ripple, however, ultimately increases response time.

At the beginning of mass flow, assuming flow is thereafter constant, the tachometer will integrate and average the digital signal over time and generate an output signal which will increase continuously from zero to a constant output value. This signal, when scaled by conversion factors including one representing a setting of the ratio of the gas to the liquid material, will represent the current desired flow rate of the gas. The scaled signal is used to control a gas flow control valve which controls the flow rate of the gas into the mix. When liquid flow to the mixer terminates, the output of the tachometer will similarly not immediately decline to zero, but will decay in a continuous manner to a zero output value. Delays in the output signal response thus occur at the beginning and end of the liquid flow. These delays result in errors in the flow of gas to the mixer. The errors which occur at the startup of the flow do not necessarily cancel the errors which occur at the termination of the flow. For these reasons, the prior art systems fail to accurately control the flow rate of the gas.

An example of problems with such systems can be seen by consideration of the case of an adhesive or sealant dispensing operation in which the flow rate and the pattern of the dispensing process vary dramatically, with material being dispensed at some times continuously and at other times intermittently. When steady state continuous flow is present, the tachometer eventually will accurately generate an output signal which is proportional to the actual liquid flow, with all errors incurred during startup having moved through the system.

When the pattern changes to, for example, a 50% duty cycle, the ability of the system to accurately track sealant flow declines. With each flow cycle an error will occur at startup and again at shut-off. Where the duty cycle is reduced further, the errors become larger. With each pulse from the flow meter the tachometer output will begin to increase to the correct output level, but if the pulse is stopped before this level is reached, the output signal will begin to decay back to zero and will never assume the correct relationship to the actual liquid material flow. In the worst case of short duration widely spaced pulses, a single pulse to the tachometer will cause the tachometer to call for zero flow of gas even though foam material has been dispensed from the mixer. Similarly, widely spaced single pulses with large dwell times may produce a signal calling for no gas flow at all, even though foam material is being dispensed and make-up liquid material is flowing to the mixer. In such cases, the maximum possible error would be present.

Accordingly, there is a need to provide a method and apparatus for controlling the gas-to-material ratio in a foam dispensing system which will maintain the ratio accurately, particularly where the dispensing rate of the foam and supply rate of liquid varies substantially or often.

SUMMARY OF THE INVENTION

It is an objective of the present invention to accurately maintain the gas-to-material ratio in a foamed material dispensing system, and particularly where the flow of the dispensed foam switches on and off frequently or varies rapidly.

According to principles of the present invention, a signal proportional to the flow of high viscosity liquid material in a foam dispensing system is generated and information representing the cumulative amount of gas needed to maintain the gas concentration of the dispensed foamed is collected. The collected information is reduced only by the flow of gas actually mixed with the liquid material to be foamed. The difference remaining is used to generate a control signal, according to the desired gas-to-liquid ratio of the mix, to control the flow of gas into the mix.

In accordance with the preferred embodiment of the invention, a foamed adhesive and sealant material is produced by mixing pressurized gas with a high viscosity liquid material in a predetermined gas-to-liquid ratio. The flow of liquid is precisely measured and the measured liquid flow value is accumulated. From the accumulated value, the total gas needed to maintain the ratio is derived. The amount of gas injected into the mix is also measured and that measurement subtracted from the total amount needed to maintain the correct gas-to-liquid ratio. The difference becomes an error signal which is stored. The error signal represents the cumulative difference between the computed amount of gas required to produce the desired ratio given the measured amount of liquid and measured amount of gas actually injected into the mixer. Injection of the gas is controlled in response to the cumulative error signal so that any delay in the response of the flow of the gas to the control signal will continue to influence the control signal so as to call for additional gas flow to the mixer until the error is eliminated and the desired ratio is attained. The gain or sensitivity of the control signal to the error signal is such that the system responds quickly, yet in a stable manner, to inject the gas needed to reduce or eliminate the stored error.

Further, in accordance with the preferred embodiment of the invention, the control signal to the gas flow control valve is an analog signal having a magnitude which varies in relation to both the current flow rate of liquid material and the magnitude of the cumulative error term.

More particularly, with the preferred embodiment of the present invention, the amount of the liquid material which flows into a mixer during each interval of time is directly measured using a digital flow meter which generates a square-wave output signal, each pulse of which represents the same fixed amount of the liquid material, as for example liquid sealant, to a mixer. These pulses are counted and the count multiplied by the desired ratio to produce a value proportional to the amount of gas to be injected into the mixer to maintain the desired gas-to-liquid ratio for the measured incremental amount of sealant flow measured during the interval. Simultaneously, the actual amount of gas to flow into the mixer during the corresponding time interval is also measured and subtracted from the computed desired amount of gas which should be injected. The difference is then added to an error term so as to accumulate, or integrate, the difference so that it represents the total gas which is still to be injected into the mixer to properly dilute the injected liquid material. The error term is, accordingly, the stored value representing the total amount of gas required to produce a foamed adhesive sealant from the measured total amount of liquid material which has been delivered to the mixer. The error term is only reduced by an amount equal to the actual amount of gas delivered to the mixer.

With the control of the present invention, pulses from the flow meter are counted and stored so that each pulse can be thereafter acted upon. For each pulse received from the liquid material flow meter, the controller will ultimately inject the appropriate mass of gas, which, when at standard temperature and pressure, will match the volume of the unit of liquid material represented by the digital pulse. Any difference between the amount of ga required to be injected and the amount of gas actually injected is accumulated as an error term which continually influences the control signal to the gas injector control valve until all of the gas required to reduce the error has been injected. By this method, regardless of the rate of delivery, the eventual error will thus be zero.

During dynamic density control, that is, where foamed adhesive, sealant or other such foam is to be dispensed, and the liquid is injected into the mixer at a changing rate, changes in injection rate of the gas will always lag the liquid flow rate changes. Prior art systems which rely on analog servo control of gas flow fail to deal with this error. With the present invention, this delay does not degrade the accuracy of the density control. This is in part because errors caused by the lag continue to influence the control signal until the error has been eliminated. Further, with the back mixing phenomena which is present in the mixing device a portion of the foam adhesive recirculates to mix with fresh liquid material and newly injected gas in the mixer. Thus, the gas which is injected, though delayed slightly, still results in the maintenance of a uniform gas-to-liquid ratio within a few percent of the ratio setting.

With the preferred embodiment of the present invention, a single pulse from the flow meter represents a fixed volume of liquid. To achieve the proper mix ratio, a corresponding fixed volume of gas (at standard temperature and pressure) can be injected over virtually any period of time from zero to infinity. If the controller supplies the full amount of gas required before the next plus is generated representing the injection of another increment of liquid into the mixer, the new solution in the mixer will have the same density reduction as the material that just left the mixer. As long as the gas is injected at a rate which will tend to quickly reduce errors which occur, the back mixing will cause a substantially uniform density adhesive to be maintained. Small, intermittently applied flows which plagued the prior art systems do not pose a problem with the controller of the present invention. Accordingly, the present invention provides the advantage of a uniform gas-to-liquid material ratio, or uniform gas concentration, in a foam material dispensing operation in which the flow rate varies or switches on and off rapidly.

These and other objects and advantages of the present invention will be more readily apparent from the following detailed description of the drawings in which:

Figure 1:
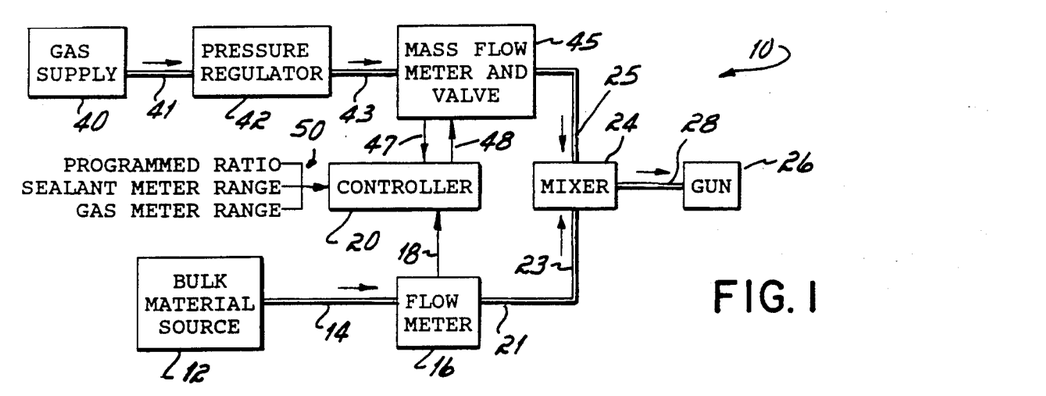
FIG. 1 is a block diagram of a preferred embodiment of a foam adhesive mixing system according to principles of the present invention.

Referring to FIG. 1, a foam adhesive mixing and dispensing system 10 is illustrated. This illustrated embodiment presents a typical system in which a high viscosity liquid sealant or adhesive material is mixed at high pressure with a gas at a predetermined ratio to produce and dispense upon a part a foamed adhesive sealant of a desired gas concentration or material density. The system 10 for which the present invention is most beneficial is the high viscosity polymer adhesive material dispensing system of the type disclosed in Cobbs U.S. Pat. No. 4,778,631 incorporated by reference above. The invention also may be used with advantage in heated or hot-melt foam material dispensing systems and in systems with external recirculating loops for the foamable mixed pressurized material such as disclosed in Klein U.S. Pat. No. 4,779,762. Many hot-melt systems, for example, such as those disclosed in the Klein patent, employ recirculating loops external to the mixer which allow greater time for correction of the gas-to-material ratio of the mix. Systems of the type disclosed in the Cobb patent, however, employ sealant of high viscosity, such as in the range of from 50,000 to greater than 1,000,000 centipoise which normally cannot be recirculated effectively with the pressures available in such systems. In "dead end" systems, that is systems without return loops for recirculation of the mixture, where rapid response of the gas injection rate to the material flow is more critical, the present invention has the greatest advantages.

The system 10 includes a supply of bulk adhesive sealant material 12 from which the material is provided in highly viscous form to an output hose or pipe 14 which directs the liquid sealant material through a digital flow meter 16. The meter 16 produces output pulses on a signal line 18 to a controller 20. The controller 20 is a microprocessor based device programmed to function in accordance with the flowchart of FIG. 2 and corresponding description set forth below. The output pulses each represent a fixed incremental volume of sealant flowing through the meter 16, and from there through line 21 to a mixer 24. In the mixer 24, the sealant is mixed with a gas, preferably nitrogen.

The gas is injected through a gas line 25 into the mixer 24 where it is mixed with the sealant to produce a pressurized foamable sealant adhesive material. The foam adhesive so mixed is delivered to a dispensing gun 26 to which it is connected through a hose 28. The gas, or blowing agent, is supplied from a pressurized gas source or supply 40 through the line 41 and pressure regulator 42 through the line 43 to the input of a mass flow meter 45. The gas within the system 10 from the supply 40 to the gun 26 is maintained under sufficient pressure to essentially dissolve the gas in the sealant from the mixer 24 to the gun 26. As such, the gas will only contribute to approximately 1/1000th of the mass of the mix prior to release from the gun 26.

The flowmeter 45 measures the mass of gas flowing into the mixer 24 and also controls the flow of the gas therethrough. The flowmeter 45 has an outlet connected to the gas inlet line 25 to the mixer 24. The flow meter 45 produces an analog output signal proportional to the gas flow rate through the flow meter 45 on a signal line 47 which is connected to an analog signal input of the controller 20. The controller 20 produces an analog output signal on an output line 48 to the flow meter 45. The flow meter contains a servo-valve which is responsive to the analog input signal on line 48 from the controller 20 to vary the gas injected on line 25 to the mixer 24 in accordance with the logic of the controller 20, described below.

The controller 20 has a set of inputs 50 which accept settings from the operator which include a setting for the programmed ratio of gas to sealant, preferably in volume percentage of the gas to the total mixture corrected to standard temperature and pressure. The controller 20 also has a sealant meter range setting and a gas meter range setting.

The operation of the system 10 proceeds with a piston pump (not shown) in the bulk sealant source 12 supplying sealant at constant pressure on the line 14 to the flow meter 16. Similarly, nitrogen or other suitable gas from the supply 40 is supplied at constant pressure at the outlet 43 of the regulator 42 to the gas flow meter 45. The sealant is supplied further at constant pressure through the inlet line 21 of the mixer 24. The sealant flow is affected by the demand for sealant at the mixer 24 which results when adhesive is dispensed from the gun 26 in response to a programmed robot controller (not shown) of the dispensing system. The amount of gas, however, which is delivered at the inlet 25 of the mixer 24 is controlled by the operation of the servo-valve of the gas meter 45 in response to the control signal on the line 48 from the controller 20.

The operation of the system 10 proceeds with the system demanding the adhesive from the gun 26 by a control signal which opens the gun 26 to dispense mixed adhesive foam. The dispensing of the adhesive causes additional make-up sealant to flow through the meter 16 and into the mixer 24 by way of the line 21. The flow of sealant through the meter 16 causes a series of pulses to be output by the flow meter 16 on the line 18 to the controller 20, each pulse representing a fixed incremental volume of sealant flow through the meter 16. The controller responds by reading the analog signal on the analog input line 47 from the gas flow meter 45 to determine the amount, if any, of gas which has flowed through the meter 45. The controller then generates, in response to the accumulated signals on lines 18 and 47, a control signal on the controller output line 48 to the valve of the meter 45. The valve of the meter 45 operates in response to the signal on line 48 to cause a flow of gas to occur, at a rate responsive to the control signal, on the line 25 to the mixer 24.

At the mixer 24, the gas is mixed with the sealant flowing into the mixer from the line 21. This mixture is recirculated within the mixer 24 so that it achieves a uniform density at the ratio which has been programmed.

Figure 2:
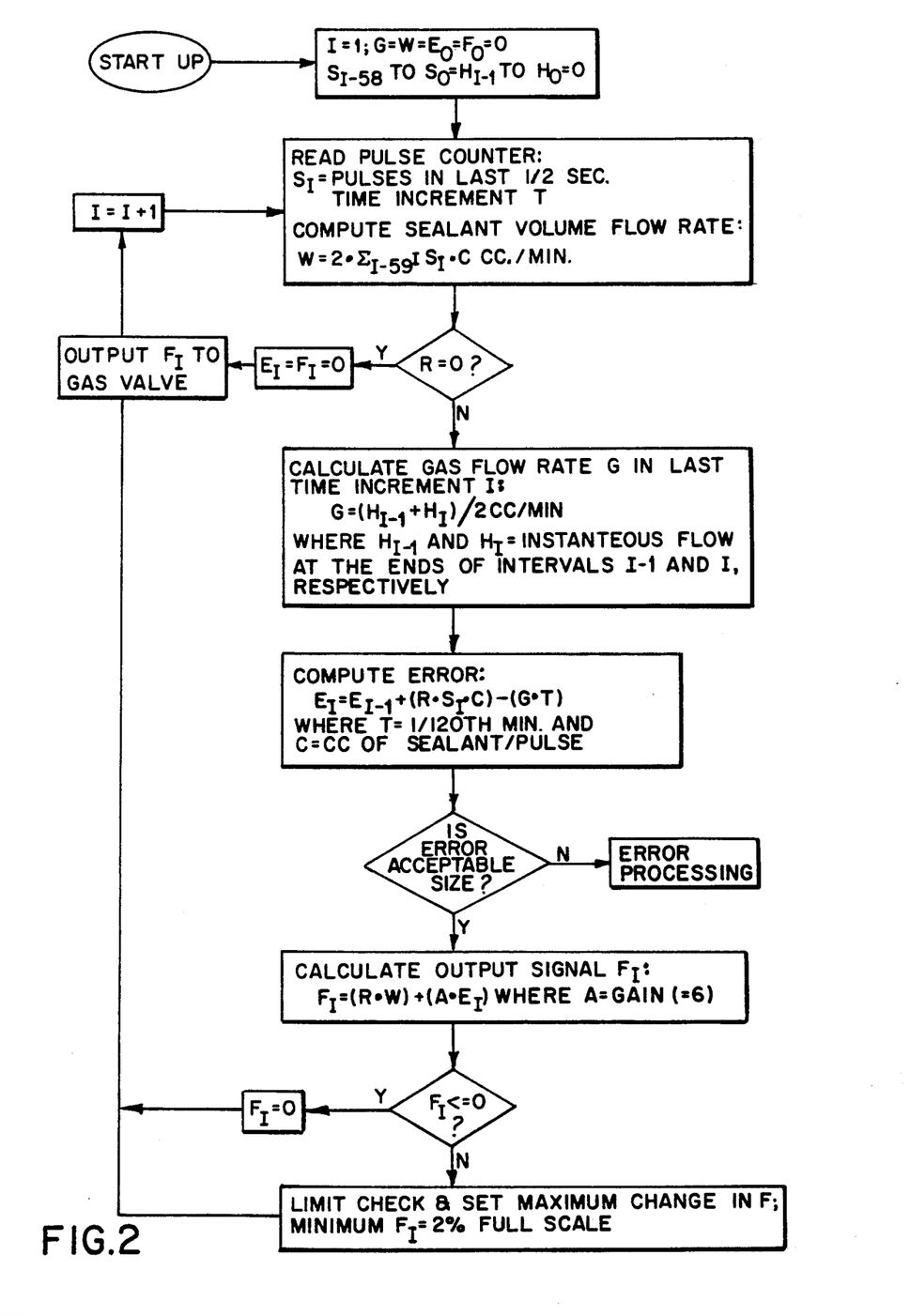
FIG. 2 is a flowchart of the system of FIG. 1 controlled in accordance with principles of the present invention.

The operation of the controller 20 is represented by the flowchart of FIG. 2. The controller stores values for certain constants for use by the control logic. These values include the timer interval T (preferably equal to ½ second) which determines the frequency of the flow measurements taken by the meters 16 and 45, the gas ratio setting R of the adhesive (for example 50%), the flow rate conversion constant C (representing the sealant flow in cubic centimeters per pulse from the sealant flow meter 16), and the gain A of the control signal equation discussed below.

On startup, certain initial values are set. These include an interval counter I which is set to 1, and all initial values of variables S, H, G, W, E and F, hereinafter described, which are set to zero. The variables I, G and W are single value variables assigned in the controller 20. The variables H, E and F each have two values, one representing a value at the end of the last increment I, and one representing the immediately preceding value at the end of the interval I-1. Accordingly, $H_I$ represents the current flow rate signalled on the line 47 from the flow meter 45, and $H_{I-1}$ represents the flow rate measured on the line 47 at the previous measurement made a time increment T in the past. $E_I$ and $F_I$ represent the computed error and control signals at the end of the interval I while $E_{I-1}$ and $F_{I-1}$ represent the respective values of E and F computed at a time increment T in the past. The variable S has 60 values each representing a measurement of sealant flow $S_{I-59}$ through $S_I$ at the sixty time intervals ending with the current time interval I.

After startup at each time interval I, a reading is taken over the last ½ second time increment T and the number of pulses appearing at the line 18 during that time increment to the controller 20 is stored as the value $S_I$. Approximately simultaneously, the analog value of gas currently flowing is read on the line 47 to the controller 20 and stored as the value $H_I$. Then a value of the total volume of sealant is calculated to equal the volume represented by the total number of pulses received by the controller 20 from the flow meter 16 during the preceding 30 seconds, or the last 60 time increments T from I−59 to I. The volume is calculated according to the equation:

$$W = 2 \times \Sigma_{I-59}{}^I S_I \times C \text{ (in cc. per minute)},$$

where C equals the number of cubic centimeters of sealant per pulse from the flow meter 16. Where I equals less than 60 (that is, during the first 60 time increments after startup), W is multiplied by 60 and divided by I to insure that the value of the control signal is properly scaled for the startup conditions. (This correction during the first 60 time intervals after startup is not shown in the flowchart of FIG. 2.) In the equation for W, the value of C is a constant. After W is computed, the ratio R is tested and, if R is zero, the error E and the control signal F are set to zero and the control signal F is output to the control valve of the meter 45. If the ratio R is not equal to zero then the control program within the controller 20 proceeds to calculate the control signal.

The volume of gas flow G during the interval I is calculated by averaging the flow rate at the beginning of the interval I, $H_{I-1}$, and the flow rate at the end of the interval I, $H_I$, according to the equation $G = \frac{1}{2} \times (H_{I-1} + H_I)$. The flow G is in cc./min., and of the same scale as the signal W which represents sealant flow rate.

Next the error $E_I$ is computed to represent the cumulative value of the difference between the sealant flow and the gas flow integrated from the startup of the operation. The error is computed by adding the cumulative error at the end of the last increment I−1 (or $E_{I-1}$) to the gas which should be injected to properly dilute the sealant which flowed in interval I (which is equal to $R \times S_I \times C$) and then subtracting the gas volume which was injected during the interval I (which is computed as $G \times T$), or as represented by the equation:

$$E_I = E_{I-1} + (R \times S_I \times C) - (G \times T),$$

where T equals the time duration of the interval I, or preferably 1/120th minute, and C equals the sealant volume per pulse from the sealant flow meter 16. If the error is unacceptable, then the program will enter an error processing mode. Otherwise, it will proceed to calculate the value of the control signal to be output from the controller 20 to the valve of the gas meter 45.

The calculation of the control signal is made by multiplying the sealant flow rate W by the ratio setting R and adding to it the error term $E_I$ multiplied by a gain factor A which, in the preferred embodiment using the values set forth above, preferably equals 6. The control signal equation thus is:

$$F_I = (R \times W) + (A \times E_I).$$

In the event that the control signal calculated according to the formula is less than zero, it is set to zero. Otherwise, the value of the control signal $F_I$ is checked against a predetermined limit imposed on the rate of change of the signal F for stability of the control operation. The limit is selected in accordance with the response time of the valve of the gas flow meter 45. If the change $(F_I - F_{I-1})$ is greater than the rate of change which the servo valve of the meter 45 can track, then $F_I$ is increased or decreased only in the maximum amount which the valve can follow. In addition, the minimum value of $F_I$ which is output to the gas valve will always be set to at least 2% of the full scale signal to which the valve of meter 45 will respond, unless a zero value of $F_I$ is required, in which case a zero value is sent to the valve of the meter 45.

The performance of the system according to the preferred embodiment of the invention is illustrated by the calculated examples of FIGS. 3A and 3B and FIGS. 4A and 4B. In these examples, the density reduction ratio is taken as 50%, or an equal volume of sealant and gas (at standard temperature and pressure), in order to best illustrate the operation of the control. It will be appreciated, however, from the description below that in the general case, the curves representing sealant on FIGS. 3A, 3B, 4A and 4B will be scaled differently than those representing gas.

Figure 3A:
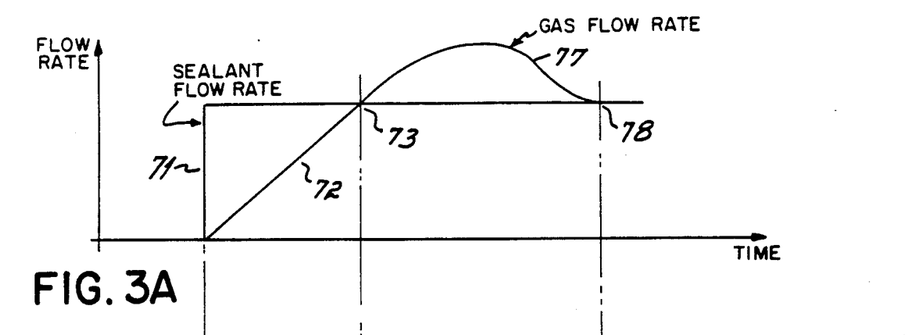
FIGS. 3A & 3B are graphs illustrating sealant and gas flow rate and cumulative volume for the system of FIG. 1 under steady state operation.
Figure 3B:
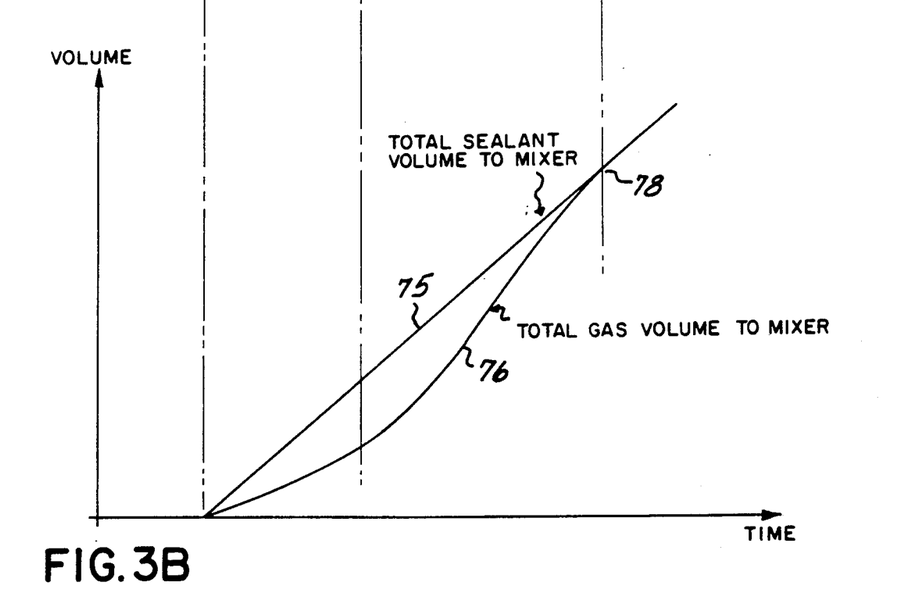
Figure 4A:
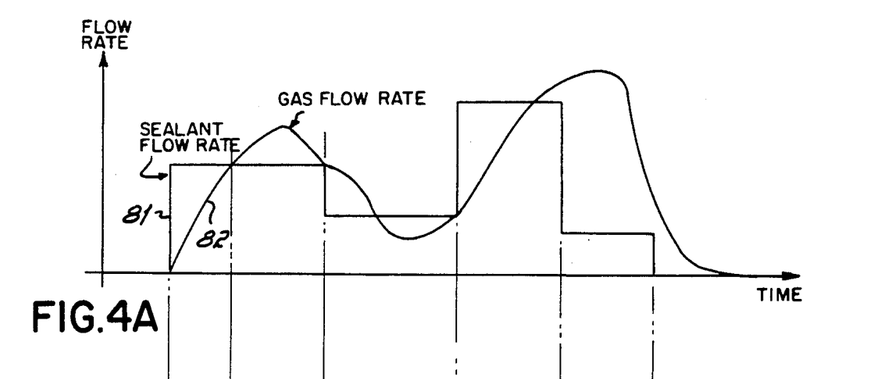
FIGS. 4A & 4B are graphs similar to FIGS. 3A & 3B illustrating operation under rapidly varying adhesive flow conditions.
Figure 4B:
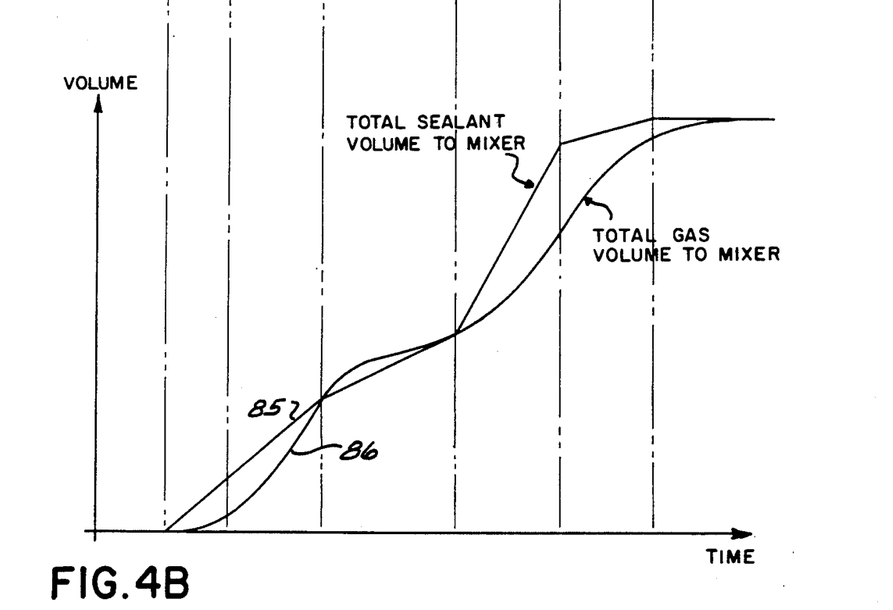

FIGS. 4A and 4B represent the case of constant sealant flow following a startup from a zero flow rate of sealant. In the graph of FIG. 3A, the sealant flow is shown to step instantaneously from zero to a value represented by the line 71. Such a sealant flow will cause the sealant flow meter 16 to generate a continuous stream of regularly spaced pulses on the line 18 to the controller 20. As soon as these pulses appear, the error term $E_I$ accumulates a value equal to the amount of sealant which passed through the meter 16 to be reduced only by the amount of gas (G × T) to be measured by the gas flow meter 45. As long as an error signal $E_I$ or a sealant flow signal (R × W) is present, a control signal $F_I$ will be sent to the valve of gas meter 45. This signal will cause an increasing flow of gas at a rate G to flow through the meter 45 as represented by the line 72 on the graph of FIG. 3A.

As seen in FIG. 3A, the area between the curves 71 and 72 represents the accumulated difference between the sealant flow and gas flow to the mixer 24. Thus, when the gas flow rate G equals the sealant flow rate $S_I$, which occurs first at the crossing point 73, the ratio will be sealant rich. This condition is represented by the inequality of the values of the curves 75 and 76 in FIG. 3B which represent the cumulative sealant flow and cumulative gas flow, respectively.

When the sealant and gas flow rates, $S_I$ and G, respectively, are equal (at the time represented at 73) the error term $E_I$ will equal the error term at the end of the last time interval I−1 ($E_{I-1}$), since the terms (R × $S_I$ × C) and (G × T) will be equal. In this condition, the value of the output signal will continue to be influenced by the accumulated error term (A × $E_I$) and continue to increase the gas flow rate as shown in the portion 77 of the curve 72 in FIG. 3A. This will cause the total gas delivered to the mixer 24 to increase until it approaches that of the sealant at point 78 in FIGS. 3A and 3B. At the point 78 and thereafter, as long as the sealant continues to flow at a constant rate, the value of the error $E_I$ will be zero, the value of (A × $E_I$) will similarly be zero, and the control signal will have reached a steady state value controlled by the term (R × W).

A major value of the control according to the present invention is more readily apparent in the application illustrated by the example of FIGS. 4A and 4B in which the curves 81, 82, 85, and 86 similarly refer to the sealant flow rate $S_I$, the gas flow rate G, the cumulative sealant flow to the mixer 24, and the cumulative gas flow to the mixer 24, respectively. FIGS. 4A and 4B show the approach of the gas flow to that of the sealant flow to the mixer 24 in response to a plurality of changes in the sealant flow rate.

The system thus described is capable of achieving the objectives and providing the advantages set forth above in accordance with the principles of the present invention which is set forth in the following claims:

We claim:
1. A foam dispensing system comprising:
means for dispensing foamable material;
means for supplying liquid material to said foamable material dispensing means;
means for supplying a pressurized gas to said foamable material dispensing means;
means connected in said liquid material supply means for generating a digital liquid material flow signal comprised of a series of pulses, each pulse representing the flow of a fixed amount of liquid material from said liquid material supply means;

means connected in said gas supply means for generating a gas flow signal relating to the amount of gas supplied from said gas supply means;

variable gas flow valve means connected in said gas supply means for varying the flow of gas from said gas supply means in response to a control signal; and controller means having an output connected to said gas flow valve means for controlling the rate of the flow of gas from said gas supply means, said controller means including:

means receiving and storing predetermined setting information of desired gas content of the foamable material, means responsive to the predetermined setting information, the liquid material flow signal and the gas flow signal for accumulating information relating to the difference between the amount of gas required to be supplied from said gas supply means to maintain the desired gas content of the foamable material being dispensed and the amount of gas supplied from said gas supply means, and means for generating a control signal at said controller output at least partially in relation to said accumulated information.

2. The system of claim 1 further comprising:

means having a gas supply inlet connected to said gas supply means, a liquid material inlet connected to said liquid material supply means and an outlet connected to said dispensing means for mixing liquid material supplied by said liquid material supply means and gas supplied by said gas supply means to form a foamable material for delivery from its outlet to said dispensing means.

3. The system of claim 2 wherein:

said digital liquid material flow signal generating means includes a liquid material flow meter for measuring the volume of liquid material flowing therethrough to said mixing means.

4. The system of claim 3 wherein:

said gas flow signal generating means includes a gas flow meter for measuring the mass of gas flowing therethrough to said mixing means.

5. The system of claim 2 wherein:

said gas flow signal generating means includes a gas flow meter for measuring the mass of gas flowing therethrough to said mixing means.

6. The system of claim 1 wherein said information accumulating means includes:

means for counting the pulses of said digital liquid material flow signal during a first interval of time;

means responsive to the number of pulses counted by said pulse counting means during said first interval and said predetermined setting information the amount of gas required to be supplied to maintain the desired gas content of the foamable material for the amount of liquid material supplied during said first interval;

means for determining from said gas flow signal the amount of gas supplied from said gas supply means during said interval of time;

means for computing, from the pulse count, the determined amount of supplied gas and the determined amount of gas required to be supplied during said first interval, a value proportional to the difference between the amount of gas supplied and the determined amount of gas required to be supplied during said interval; and means for storing the computed difference.

7. The system of claim 6 wherein said information accumulating means further includes:

means for counting the pulses of said digital liquid material flow signal during a second interval consecutive and subsequent to said first interval of time;

means responsive to the number of pulses counted by said pulse counting means during said second interval and said predetermined setting information the amount of gas required to be supplied to maintain the desired gas content of the foam for the amount of liquid material supplied during said second interval;

means for determining from said gas flow signal the amount of gas supplied from said gas supply means during said second interval of time;

means for computing from the pulse count and the determined amount of gas and said predetermined setting information a value proportional to the difference between the amount of gas supplied and the amount of gas required to be supplied during said second interval; and means for adding the difference computed during said second interval to the stored difference.

8. The system of claim 7 wherein:

said control signal generating means is operative to generate said control signal at least in part in relation to said stored difference.

9. The system of claim 8 wherein:

said control signal generating means includes means for generating an analog control signal having a amplitude related in part to said stored difference and in part to the number of pulses counted during a predetermined number of immediately preceding intervals.

10. A dispensing system for dispensing a foamable material containing a liquid material and a predetermined ratio of gas, said system comprising:

means for dispensing a foamable material;

means for mixing a liquid material with a pressurized gas to form foamable material for delivery to said dispensing means;

means for supplying liquid material to said mixing means including means for generating a liquid material flow signal related to the amount of liquid material supplied to said mixing means;

means for supplying a pressurized gas to said mixing means including means for generating a gas flow signal relating to the amount of gas supplied to said mixing means;

said gas supply means further including gas flow control means for affecting the flow of gas to said mixing means in response to a control signal;

controller means having an output connected to said gas flow control means for controlling the relation of the flow of gas to said mixing means to the flow of liquid material to said mixing means, said controller means including:

means responsive to the liquid material flow signal for deriving information relating to the amount of gas required to be supplied to said mixing means, and means responsive to said derived information and said gas flow signal for accumulating error data representing the difference between said amount of gas required to be supplied to said mixing means and the amount of gas which has been supplied to said mixing means, and means responsive to said error data for generating a control signal on said output effective to cause the gas to flow to said mixing means of said error data.

11. The system of claim 10 wherein said error data accumulating means includes:

means for determining from said liquid material flow signal the amount of liquid material supplied to said mixing means during a first interval of time and deriving from the supplied amount of liquid material a corresponding amount of gas required to be supplied to said mixing means;

means for determining from said gas flow signal the amount of gas supplied to said mixing means during said first interval of time;

means for computing from the determined amounts of gas supplied and required to be supplied during said first interval a first value proportional to the difference between said amounts; and means for storing the computed value.

12. The system of claim 11 wherein said error data accumulating means includes:

means for determining from said liquid material flow signal the amount of liquid material flowing to said mixing means during a second interval of time consecutive and subsequent to said first interval and deriving from said determined amount of liquid material a corresponding amount of gas required to be supplied to said mixing means;

means for determining from said gas flow signal the amount of gas supplied to said mixing means during said second interval of time;

means for computing from the determined amounts of gas supplied and required to be supplied during said second interval a second value proportional to the difference between said amounts; and means for adding the second computed value to the stored computed value.

13. The system of claim 12 wherein:

said control signal generating means is operative to generate said control signal at least in part in relation to said stored difference.

14. The system of claim 13 wherein:

said control signal is an analog control signal; and said control signal generating means includes means for generating an analog control signal having an amplitude related in part to said stored value and in part related to the amount of liquid material supplied to said mixing means during a predetermined number of immediately preceding intervals.

15. A method of controlling the gas content of a foamable material dispensed from a foamable material dispensing apparatus having a mixer for mixing liquid material and gas to form a foamable material, means for supplying liquid material to the mixer, means for supplying a density reducing gas to the mixer, and dispensing means for dispensing the foamable material with a predetermined gas content, said method comprising the steps of:

storing information relating to a predetermined gas content of the foamable material to be dispensed;

measuring the amount of liquid material supplied to the mixer during a first interval of time and generating a liquid material flow signal representing the amount of liquid material supplied to the mixer during the first interval;

measuring the amount of gas supplied to the mixer during the first interval of time and generating a gas flow signal representing the amount of gas supplied to the mixer during the first interval of time;

storing information from said measurements;

repeating said measuring steps and said storing step to accumulate information relating to the amount of liquid material and the amount of gas supplied to the mixer during a plurality of consecutive intervals;

generating a control signal having a value at least in part related to said stored accumulated information;

controlling the flow of gas flow to the mixer in response to said control signal to affect the flow of gas to the mixer at least partially in response to the measured amount of liquid material supplied to the mixer and the amount of gas supplied to the mixer; and dispensing foamable material from said mixer onto an object.

16. The method of claim 15 wherein:

the liquid material flow signal is a digital signal;

said liquid material measuring step includes the steps of generating said digital signal comprising a series of pulses, each pulse representing the flow of a fixed amount of liquid material to the mixer; and said liquid material flow measuring step includes the step of counting the pulses during the interval of time.

17. The method of claim 15 wherein:

each of said liquid material flow measuring steps further comprises the steps of:

deriving the amount of gas required to be supplied to the mixer from the amount of liquid material measured and the stored information relating to the predetermined gas content, and computing the difference between the amount of gas required to be supplied to the mixer and the measured amount of gas supplied to the mixer; and said information storing step includes the step of storing an error signal related to the accumulated computed differences.

18. The method of claim 15 wherein:

each of said liquid material measuring steps is followed by the steps of:

determining from the amount of liquid material supplied to the mixer during said the respective interval and said predetermined gas content information the amount of gas required to be supplied to maintain the gas content of the liquid material supplied during the respective interval at the predetermined gas content; and computing from said determined required amount of gas and the measured amount of gas supplied during the respective interval, an error value proportional to the difference between the amount of gas supplied and the determined amount of gas required to be supplied during said interval; and information stored in each of said storing steps being one of said computed error values computed for the respective interval.

19. The system of claim 15 wherein:

each liquid material measuring step includes the steps of generating a pulse for each incremental amount of liquid material supplied to the mixer to form a digital liquid material flow signal, and counting the pulses of a digital liquid material flow signal during each interval;

determining, in response to the number of pulses counted during each interval and predetermined gas content information the amount of gas required to be supplied to maintain the desired gas content of the foamable material for the amount of liquid material supplied during the respective interval;

determining from said gas flow signal the amount of gas supplied during the respective interval;

computing from the pulse count, the determined amount of gas and said predetermined gas content information a value proportional to the difference between the amount of gas supplied and the amount of gas required to be supplied during the respective interval; and adding the difference computed during the respective interval to a difference stored from the last preceding interval.

* * * * *

UNITED STATES PATENT AND TRADEMARK OFFICE
CERTIFICATE OF CORRECTION

PATENT NO. : 5,056,034

DATED : October 8, 1991

INVENTOR(S) : Rucki et al.

It is certified that error appears in the above-identified patent and that said Letters Patent is hereby corrected as shown below:

Column 3, line 15, "ar" should be --are--

Column 5, line 38, "ga" should be --gas--

Column 6, line 2, "plus" should be --pulse--

Column 8, line 60, "E" should be --$\Sigma$--

Column 9, line 48, "o" should be --of--.

Signed and Sealed this

Eighth Day of June, 1993

Attest:

MICHAEL K. KIRK

*Attesting Officer*     *Acting Commissioner of Patents and Trademarks*